L. H. SPRINKLE AND F. WOLFE.
TIRE FOR AUTOMOBILE WHEELS.
APPLICATION FILED APR. 23, 1919.

1,363,821.

Patented Dec. 28, 1920.

INVENTORS
Lake H. Sprinkle
Frank Wolfe
BY
Israel Benjamins,
ATTORNEY

UNITED STATES PATENT OFFICE.

LAKE H. SPRINKLE, OF BROOKLYN, AND FRANK WOLFE, OF MERRICK, LONG ISLAND, NEW YORK.

TIRE FOR AUTOMOBILE-WHEELS.

1,363,821.  Specification of Letters Patent.  Patented Dec. 28, 1920.

Application filed April 23, 1919. Serial No. 292,122.

*To all whom it may concern:*

Be it known that we, LAKE H. SPRINKLE and FRANK WOLFE, citizens of the United States, residing, respectively, at 310 Carlton Ave., Brooklyn, in the county of Kings and State of New York, and at Merrick, L. I., in the county of Nassau and State of New York, have invented a new and useful Tire for Automobile-Wheels, of which the following is a specification.

Our invention relates to improvements in tires for wheels used mainly for automobiles, and, to some extent also, for bicycles and motorcycles, and it consists in the novel features hereinafter more fully described.

The objects of our improvement are:—

First: To protect the inner tube of the tire from punctures.

Second: To reduce skidding.

Third: To make the shoe of the tire more durable and thereby reduce the cost of upkeep of an automobile.

We attain these objects by the tire illustrated in the accompanying drawing or by any mechanical equivalent or obvious modification of the same.

Figure 1:
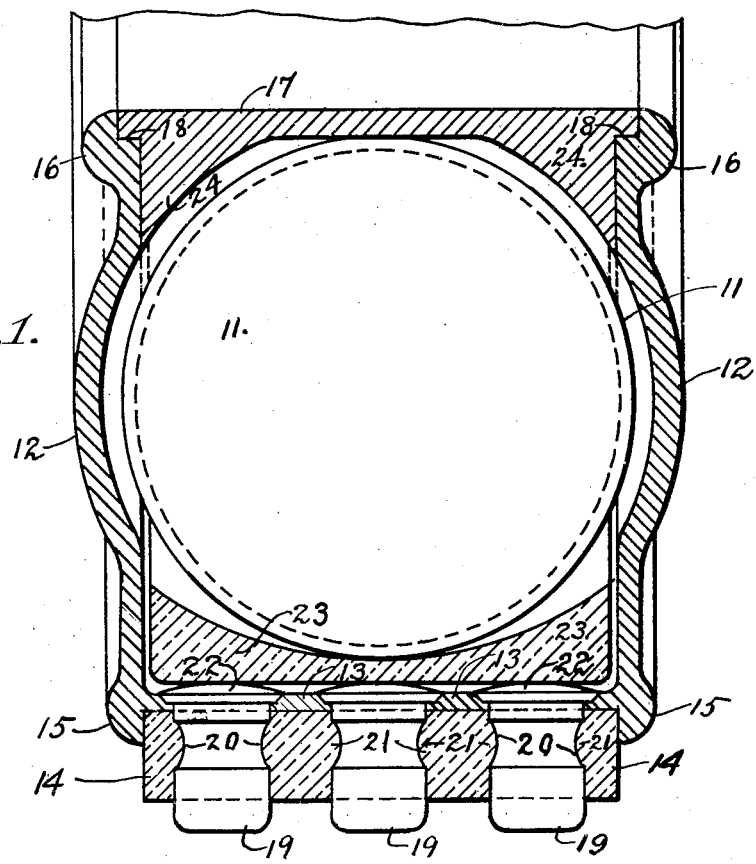

Figure 1 of the drawings shows a cross section of our tire in a plane passing through the axis of the wheel.

Figure 2:
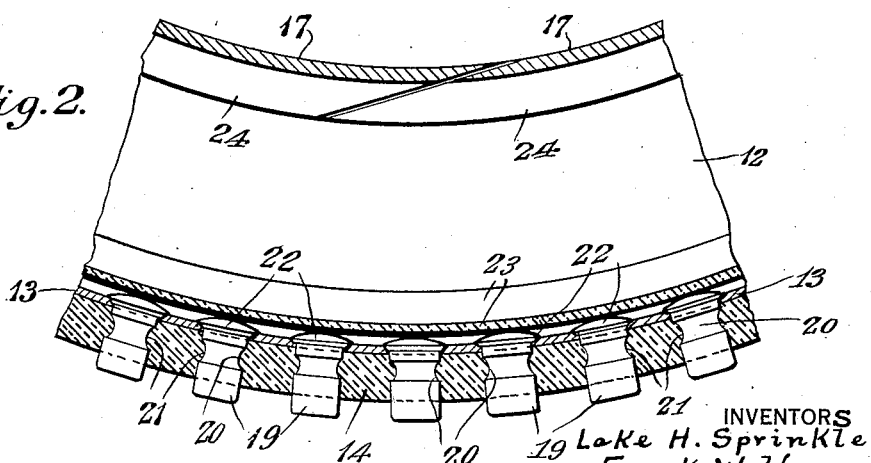

Fig. 2 shows a part section in a plane parallel to the wheel through the center thereof, omitting the inner tube.

Similar numerals refer to similar parts throughout the two views.

11 designates the inner tube of an automobile wheel, which may be of the usual shape and construction.

12 is the shoe of our tire inclosing said inner tube 11; said shoe may be made of metal or any other rigid material.

13 is the outer rim of said shoe, which is shown as having a few series of round openings, said series extending all around the periphery thereof.

14 is an annular strip of solid rubber encompassing said rim 13 and shown as having also a few series of openings therein, the openings in said strip 14 being coaxial with those in said rim 13.

19 are metal plungers adapted to have a sliding fit in said openings in said strip 14 which serve as sockets therefor; said plungers 19 are shown as extending outwardly beyond said strip 14, and their outer ends are, therefore, adapted to come into contact with the road and to receive the shock of impact with the same.

Said plungers 19 are shown as having the necks 20, which are adapted to fit the interior beads 21 in the sockets of said strip 14; they also have at their inner ends the heads 22 inside of said rim 13.

The heads 22 of the plungers 19 are shown as beveled on the outer side and resting in suitable seats formed on the inside of said rim 13 at the inner end of the above described openings therein.

Said beads 21 serve as a packing for said plungers 19 to prevent leakage of water and mud through the sockets in said strip 14.

23 is an annular wearing cushion placed in said shoe 12 and having its outer side in contact with the heads 22 of said plungers 19 and its inner surface, which has a curved cross-section as shown, in contact with said inner tube 11.

Said shoe 12 is made open on its inner periphery and is provided with the seats 18 adapted to receive a removable split ring 17, which is adapted to fit said seats 18 at its edges and which has the ribs 24 near its edges, which ribs are shaped to fit the outline of said inner tube 11.

Said shoe 12 also has the inner beads 16 and the outer beads 15 adapted to take up the wear and jolts due to incidental contact with the curb and obstacles on the road.

Said split ring 17 may be sprung into position on said seats 18, its ends being tapered to overlap each other thereby providing a smooth surface in contact with said inner tube 11.

Said spring 17 also serves to connect said shoe 12 to the felly of an automobile wheel in the same way as the demountable rim of usual tires.

It is evident that the reaction of the road, due to the pressure of the wheel, will cause said plungers 19 to press on said wearing cushion 23, which in turn will compress the inner tube evenly, the latter pressing against the sides of said shoe 12 and against said ring 17.

Another wearing cushion similar to 23, may be inserted between said ring 17 and the inner tube 11, if desired.

There will be little or no relative motion between said inner tube 11 and said shoe 12 when the latter is made of metal or some other rigid material; there will, therefore, be less wear on the inner tube than when using the ordinary rubber shoe.

The metal shoe 12 will also be more durable than a rubber shoe, and the cost of upkeep of an automobile will thereby be reduced.

No punctures will be possible through the solid rubber strip 14 and the rim 13 of the shoe, nor through the metal plungers 19.

Many changes could be made in the details of our tire for automobile wheels without departing from the main scope of our invention.

We do not therefore restrict ourselves to the details of our tire as shown in the drawings, but we include also all mechanical equivalents and reasonably obvious modifications of the same.

What we claim as our invention and desire to secure by Letters Patent, is:—

In a tire for automobile wheels the combination of an elastic medium, a shoe of rigid material adapted to inclose said elastic medium, said shoe having sides and an outer rim, an annular strip of solid rubber encompassing said rim, openings in the outer rim of said shoe and sockets in said rubber strip, plungers having a sliding fit in said openings and sockets, and extending outwardly beyond said strip the outer ends of said plungers being adapted to come into contact with the road and to receive the shock of impact with the same, said plungers having at their inner ends heads inside the outer rim of said shoe, necks in said plungers, interior beads in said sockets adapted to fit said necks, thereby preventing leakage into said shoe, the heads of said plungers being adapted to transmit the shock from said plungers to said elastic medium.

LAKE H. SPRINKLE.
FRANK WOLFE.